United States Patent
Yang et al.

(10) Patent No.: US 11,477,150 B2
(45) Date of Patent: Oct. 18, 2022

(54) SERVERS, METHOD OF CONTROLLING SERVERS, AND NON-TRANSITORY COMPUTER-READABLE MEDIUMS

(71) Applicant: LINE Corporation, Tokyo (JP)

(72) Inventors: Heechan Yang, Tokyo (JP); Kenichi Sugimoto, Tokyo (JP)

(73) Assignee: LINE CORPORATION, Toyko (JP)

( * ) Notice: Subject to any disclaimer, the term of this patent is extended or adjusted under 35 U.S.C. 154(b) by 0 days.

(21) Appl. No.: 17/217,259

(22) Filed: Mar. 30, 2021

(65) Prior Publication Data

US 2021/0218697 A1 Jul. 15, 2021

Related U.S. Application Data

(63) Continuation of application No. 16/557,022, filed on Aug. 30, 2019, now Pat. No. 10,992,624, which is a (Continued)

(30) Foreign Application Priority Data

Mar. 4, 2015 (JP) ................................. 2015-042601

(51) Int. Cl.
 *G06F 15/16* (2006.01)
 *H04L 51/00* (2022.01)
 (Continued)

(52) U.S. Cl.
 CPC .......... *H04L 51/16* (2013.01); *H04L 12/1818* (2013.01); *H04L 51/12* (2013.01); *H04L 67/22* (2013.01); *H04L 67/306* (2013.01)

(58) Field of Classification Search
 CPC ..... H04L 51/16; H04L 51/12; H04L 12/1818; H04L 67/22; H04L 67/306
 See application file for complete search history.

(56) References Cited

U.S. PATENT DOCUMENTS 6,327,353 B1 * 12/2001 Fukuzawa ......... H04M 3/42008
                                                379/212.01
8,428,582 B2 *  4/2013 Ezrol ..................... H04L 12/66
                                                    455/461
(Continued)

FOREIGN PATENT DOCUMENTS

CN      1700226 A   11/2005
CN    102916961 A    2/2013
(Continued)

OTHER PUBLICATIONS

Chinese Office Action dated Jun. 17, 2021 for corresponding Chinese Application No. 201680013717.7 and English translation thereof.

(Continued)

*Primary Examiner* — Richard G Keehn
(74) *Attorney, Agent, or Firm* — Harness, Dickey & Pierce, P.L.C.

(57) ABSTRACT

Disclosed is a server capable of improving convenience for a user at the time of service registration. The server includes a service providing unit which provides a service to an unregistered user who is not registered in the service when the unregistered user accesses the service, and a storage device which stores a service history provided to the unregistered user by the service providing unit. When the unregistered user is registered in the service, the service providing unit allows the unregistered user to use the service while taking over a service history used when the unregistered user is not registered in the service.

18 Claims, 8 Drawing Sheets

Related U.S. Application Data continuation of application No. 15/858,221, filed on Dec. 29, 2017, now Pat. No. 10,447,636, which is a continuation of application No. 14/832,331, filed on Aug. 21, 2015, now Pat. No. 9,887,946.

(51) Int. Cl.
*H04L 12/18* (2006.01)
*H04L 67/50* (2022.01)
*H04L 67/306* (2022.01)

(56) References Cited

U.S. PATENT DOCUMENTS

| | | | | |
|---|---|---|---|---|
| 9,384,516 B2* | 7/2016 | Li | | G06F 21/105 |
| 10,257,291 B1* | 4/2019 | Matiash | | H04L 67/22 |
| 2002/0071540 A1* | 6/2002 | Dworkin | | H04M 3/563 |
| | | | | 379/202.01 |
| 2005/0086126 A1* | 4/2005 | Patterson | | A63F 13/12 |
| | | | | 705/26.1 |
| 2005/0195975 A1* | 9/2005 | Kawakita | | H04L 9/3236 |
| | | | | 380/30 |
| 2006/0035655 A1* | 2/2006 | Lonnfors | | H04L 67/34 |
| | | | | 455/517 |
| 2006/0112163 A1* | 5/2006 | Enatsu | | H04L 51/12 |
| | | | | 709/203 |
| 2006/0274767 A1* | 12/2006 | Dessau | | G06F 16/954 |
| | | | | 707/E17.111 |
| 2007/0185814 A1* | 8/2007 | Boccon-Gibod | | G06Q 20/1235 |
| | | | | 705/51 |
| 2008/0077600 A1 | 3/2008 | Nakamura et al. | | |
| 2008/0313543 A1* | 12/2008 | Altberg | | H04L 67/22 |
| | | | | 370/352 |
| 2009/0006188 A1* | 1/2009 | Guo | | G06Q 30/02 |
| | | | | 705/14.27 |
| 2009/0150418 A1* | 6/2009 | Shuster | | A63F 13/12 |
| 2009/0190573 A1* | 7/2009 | Siegel | | H04L 12/66 |
| | | | | 370/352 |
| 2009/0272814 A1* | 11/2009 | Granhed | | G06K 19/067 |
| | | | | 235/492 |
| 2009/0292814 A1* | 11/2009 | Ting | | H04L 51/32 |
| | | | | 709/229 |
| 2011/0032250 A1* | 2/2011 | Tanaka | | A63F 13/77 |
| | | | | 345/418 |
| 2011/0082942 A1* | 4/2011 | Takei | | G06Q 10/00 |
| | | | | 709/227 |
| 2011/0093340 A1* | 4/2011 | Kramer | | G06Q 30/02 |
| | | | | 705/14.58 |
| 2012/0192257 A1* | 7/2012 | Ishii | | H04N 1/4413 |
| | | | | 726/7 |
| 2012/0271883 A1* | 10/2012 | Montoya | | H04W 4/029 |
| | | | | 709/204 |
| 2012/0289147 A1* | 11/2012 | Raleigh | | H04W 4/50 |
| | | | | 455/3.06 |
| 2012/0311052 A1 | 12/2012 | Lee et al. | | |
| 2013/0018960 A1* | 1/2013 | Knysz | | H04L 65/403 |
| | | | | 709/204 |
| 2013/0036458 A1* | 2/2013 | Liberman | | H04L 63/0861 |
| | | | | 726/5 |
| 2013/0091213 A1* | 4/2013 | Diab | | G06Q 50/01 |
| | | | | 709/204 |
| 2013/0132854 A1* | 5/2013 | Raleigh | | H04M 15/77 |
| | | | | 715/738 |
| 2013/0198085 A1* | 8/2013 | Li | | G06F 21/629 |
| | | | | 705/59 |
| 2013/0198864 A1* | 8/2013 | Li | | G06F 21/10 |
| | | | | 726/28 |
| 2013/0257877 A1* | 10/2013 | Davis | | G06N 3/006 |
| | | | | 345/473 |
| 2014/0018040 A1 | 1/2014 | Kim | | |
| 2014/0019582 A1* | 1/2014 | Kim | | H04L 51/32 |
| | | | | 709/217 |
| 2014/0025767 A1* | 1/2014 | De Kezel | | G06Q 10/107 |
| | | | | 709/206 |
| 2014/0164502 A1* | 6/2014 | Khodorenko | | H04L 51/32 |
| | | | | 709/204 |
| 2014/0226537 A1* | 8/2014 | Kashimba | | H04L 65/4038 |
| | | | | 370/261 |
| 2014/0278676 A1* | 9/2014 | Burka | | G06Q 10/1093 |
| | | | | 705/7.19 |
| 2014/0280180 A1* | 9/2014 | Edecker | | G06F 16/285 |
| | | | | 707/769 |
| 2014/0344435 A1* | 11/2014 | Mortimore, Jr. | | H04L 43/50 |
| | | | | 709/223 |
| 2015/0024848 A1 | 1/2015 | Ino | | |
| 2015/0024852 A1* | 1/2015 | Pacey | | A63F 13/58 |
| | | | | 463/43 |
| 2015/0038178 A1* | 2/2015 | Chin | | H04W 4/21 |
| | | | | 455/457 |
| 2015/0039505 A1* | 2/2015 | Jin | | G06Q 20/4037 |
| | | | | 705/44 |
| 2015/0052206 A1* | 2/2015 | Setton | | H04L 51/32 |
| | | | | 709/204 |
| 2016/0197993 A1* | 7/2016 | Perkowski | | H04L 67/02 |
| | | | | 709/203 |
| 2016/0212230 A1* | 7/2016 | Schneider | | H04L 67/306 |
| 2022/0114652 A1* | 4/2022 | Belke | | G06Q 50/12 |

FOREIGN PATENT DOCUMENTS

| | | |
|---|---|---|
| JP | 2005516294 A | 6/2005 |
| JP | 2005322070 A | 11/2005 |
| JP | 2008-77440 A | 4/2008 |
| JP | 2010512062 A | 4/2010 |
| JP | 2014-13575 A | 1/2014 |
| JP | 2014-016980 A | 1/2014 |
| JP | 2015-19986 A | 2/2015 |
| JP | 2015518291 A | 6/2015 |
| WO | WO-2009/001036 A1 | 12/2008 |
| WO | WO-2013/116848 A2 | 8/2013 |

OTHER PUBLICATIONS

International Search Report dated Apr. 12, 2016 for corresponding International Application No. PCT/JP2016/051254.
Japanese Office Action dated Sep. 25, 2018 for corresponding Japanese Application No. 2015-042601.
Japanese Office Action dated Feb. 19, 2019 for corresponding Japanese Application No. 2018-219430.
Japanese Office Action dated Feb. 26, 2019 for corresponding Japanese Application No. 2018-226096.
Japanese Office Action dated Feb. 19, 2019 for corresponding Japanese Application No. 2018-226097.
Japanese Office Action dated Feb. 26, 2019 for corresponding Japanese Application No. 2018-240021.
Japanese Office Action dated Jul. 9, 2019 for corresponding Japanese Application No. 2015-042601.
Japanese Office Action dated Jul. 5, 2019 for corresponding Japanese Application No. 2018-226096.
Japanese Office Action dated Oct. 24, 2019 for corresponding Japanese Application No. 2019-128014.
Chinese Office Action dated Mar. 25, 2020 for corresponding Chinese Application No. 201680013717.7.
Chinese Office Action dated Dec. 31, 2020 for corresponding Chinese Application No. 201680013717.7 and English translation thereof.
Japanese Office Action dated Aug. 23, 2022 for corresponding Japanese Application No. 2021-154830 and English translation thereof.
LINE convenience book for 1 Part_8 LINE Apps for which a LINE Apps, 5000 convenient and useful, Japan, Ei Publishing Co., Ltd., 2014, pp. 03, 100, p. 101. (English translation attached).

\* cited by examiner

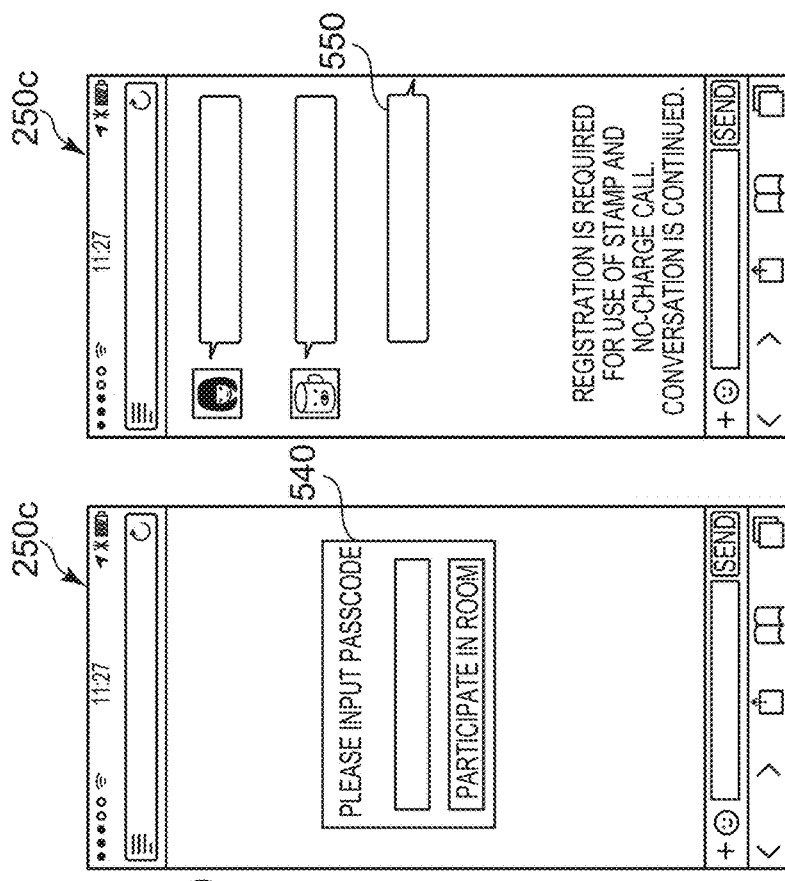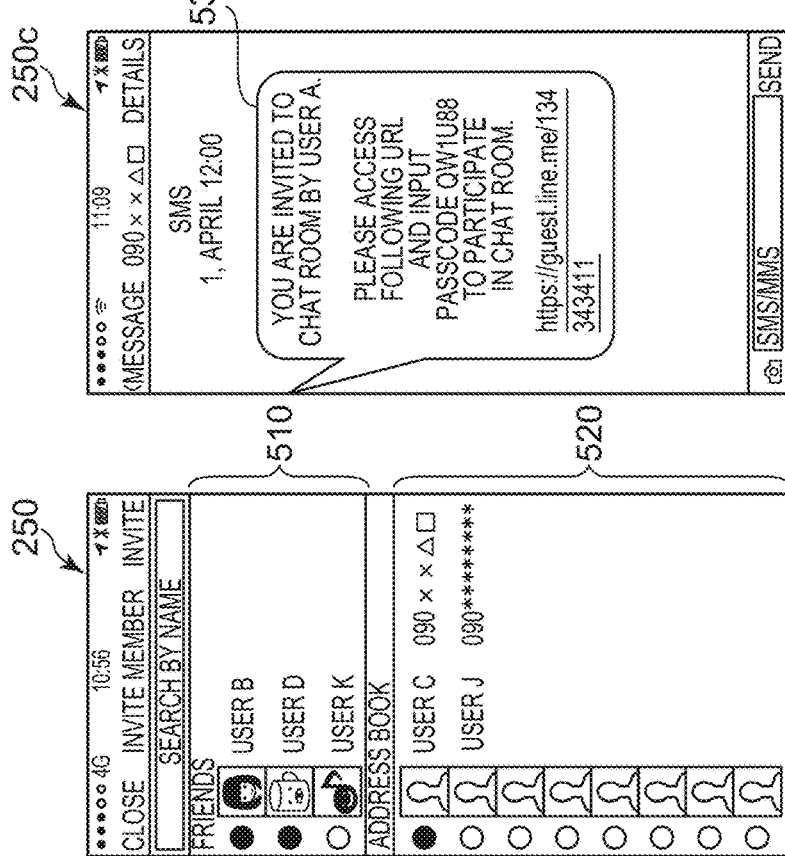

FIG. 5

| USER ID | TERMINAL IDENTIFICATION INFORMATION | CHAT ROOM URL | INVITATION MESSAGE | PASSCODE | USER IDENTIFICATION INFORMATION | MEMBER | ... |
|---|---|---|---|---|---|---|---|
| User_C | 123*56 | https://guest.line.me/134343411 | SMS 090×х△☐ | QW1U88 | jLB31 | User_A User_B User_D | ... |
| User_X | | | | | | | ... |
| User_Y | | | | | | | ... |
| User_Z | | | | | | | ... |
| ... | | | | ... | ... | | |

122TBL

SERVERS, METHOD OF CONTROLLING SERVERS, AND NON-TRANSITORY COMPUTER-READABLE MEDIUMS

CROSS-REFERENCE TO RELATED APPLICATIONS

This is a continuation of U.S. application Ser. No. 16/557,022, filed on Aug. 30, 2019, which is a continuation of U.S. application Ser. No. 15/858,221, filed on Dec. 29, 2017, which is a continuation of U.S. application Ser. No. 14/832,331 filed on Aug. 21, 2015, which claims the benefit of priority under 35 U.S.C. § 119 to Japanese Patent Application No. 2015-42601, filed on Mar. 4, 2015, in the Japanese Patent Office (JPO), the entire contents of each of which are hereby incorporated by reference in their entireties.

BACKGROUND

Field

Several of the example embodiments relate to a server, a method of controlling a server, and/or a non-transitory computer readable medium for a service system which provides part of a service to a user who is not registered in the service requiring registration.

Background

In recent years, there have been many services (messaging services) for a chat service where messages are exchanged among a plurality of user terminals through a network. Most of the services require registration; therefore, there is a problem in that users who are not registered in the services cannot experience the content and advantages of the services and do not have an opportunity to be prompted to register in the services.

SUMMARY

In the conventional art, a user not registered as a member who uses a service (such as an online game, online messaging services, online email accounts, social media services, websites, web portals, search engines, enterprise software, software as a service, etc.) only when a user registered as a member who invites the user not registered as a member is logged into a service server, and it is hard to say that an opportunity to let an unregistered user experience the content of the service is sufficiently provided. When a user not registered as a member is newly registered in the service, the user cannot continue to use game data used at the time of unregistration, and it is inconvenient for the user.

Inventive concepts related to the example embodiments are directed towards the above-described problem, and an object of the example embodiments is to provide a server, a method of controlling a server, and/or a computer program product embodied on a non-transitory computer readable medium capable of allowing an unregistered user to know the content of a service and improving convenience at the time of service registration of an unregistered user.

According to an aspect of the inventive concepts, there is provided a server that may include a memory having computer readable instructions stored thereon, at least one processor configured to execute the computer readable instructions to provide a service to an unregistered user who is not registered in the service when the unregistered user accesses the service, store a service history on a storage device, and allows, once registered, the unregistered user to use the service while taking over a service history from when the unregistered user was not registered.

The server according to at least one example embodiment the at least one processor may be further configured to receive an invitation request for inviting the unregistered user to the service from a registered user who is registered in the service, transmit an invitation message to the service to the unregistered user according to the invitation request, and provide the service to an unregistered user who accesses the service according to the invitation message. The server according to at least one example embodiment, the at least one processor may be further configured to acquire user identification information of the unregistered user who accesses the service according to the invitation message, store the invitation message and the user identification information in association with each other on the storage device, and provide the service to a user having user identification information associated with the invitation message among users who access the service according to the invitation message.

In the server according to at least one example embodiment, the at least one processor may be further configured to limit the content of the service to be provided to the unregistered user based on the content of the service to be provided to the registered user.

In the server according to at least one example embodiment, the service may include a messaging service for exchanging messages between registered users, and the service history is a message history exchanged by the unregistered user and a registered user.

In the server according to at least one example embodiment, the service may include a messaging service for exchanging messages between registered users, and the at least one processor may be further configured to prohibit the unregistered user to use content usable by a registered user other than a text message as a message.

In the server according to at least one example embodiment, the content may include at least one of an image, a video, an animation, an audio file, and a digital sticker (stamp).

In the server according to at least one example embodiment, the service may include a messaging service for exchanging messages between registered users, the invitation message may include information about one or more registered users who are able to exchange a message with the unregistered user, and the at least one processor may be further configured to prohibit the unregistered user to exchange a message with an registered user not included in the information.

In the server according to at least one example embodiment, the messaging service may exchange a message between registered users set as friends, and the at least one processor may be further configured to transmit information for displaying a registered user included in the information on a desired display device of the unregistered user as candidates of friends of the unregistered user when the unregistered user is registered in the service.

In the server according to at least one example embodiment, the service may include a call service for allowing a voice call using a communication line between registered users, and the at least one processor may be further configured to prohibit the unregistered user to use the call service.

In the server according to at least one example embodiment, the at least one processor may be further configured to skip an input procedure of a telephone number at the time of new registration in the service when the invitation message is transmitted using a communication protocol capable of using a telephone number as an address.

According to another aspect of the inventive concepts, there is provided a method of controlling a server that may include a providing, using at least one processor, a service to an unregistered user who is not registered in the service when the unregistered user accesses the service, storing, using the at least one processor, a service history provided to the unregistered user on a storage device, and, allowing, once registered, the unregistered user to use the service while taking over a service history from when the unregistered user was not registered.

According to at least one example embodiment, the method may include receiving, using the at least one processor, an invitation request for inviting the unregistered user to the service from a registered user who is registered in the service, transmitting, using the at least one processor, an invitation message to the service to the unregistered user according to the invitation request, and providing, using the at least one processor, the service to an unregistered user who accesses the service according to the invitation message.

According to at least one example embodiment, the method may include acquiring, using the at least one processor, user identification information of the unregistered user who accesses the service according to the invitation message, storing, using the at least one processor, the invitation message and the user identification information in association with each other on the storage device, and providing, using the at least one processor, the service to a user having user identification information associated with the invitation message among users who access the service according to the invitation message.

According to at least one example embodiment, the method may include limiting, using the at least one processor, the content of the service to be provided to the unregistered user based on the content of the service to be provided to the registered user.

According to at least one example embodiment, the method may include wherein the service includes a messaging service for exchanging messages between registered users, and the service history is a message history exchanged by the unregistered user and a registered user.

According to at least one example embodiment, the method may include prohibiting, using the at least one processor, the unregistered user to use content usable by a registered user other than a text message as the message, and wherein the service includes a messaging service for exchanging messages between registered users.

According to at least one example embodiment, the method may include wherein the content includes at least one of an image, a video, an animation, an audio file, and a digital sticker.

According to at least one example embodiment, the method may include prohibiting, using the at least one processor, the unregistered user to exchange a message with a registered user not included in the information, and wherein the service includes a messaging service for exchanging messages between registered users, and the invitation message includes information about one or more registered users who are able to exchange a message with the unregistered user.

According to at least one example embodiment, the method may include transmitting, using the at least one processor, information for displaying a registered user included in the information on a desired display device of the unregistered user as candidates of friends of the unregistered user when the unregistered user is registered in the service, and wherein the messaging service exchanges a message between registered users set as friends.

According to at least one example embodiment, the method may include prohibiting, using the at least one processor, the unregistered user to use the call service, and wherein the service includes a call service for allowing a voice call using a communication line between registered users.

According to at least one example embodiment, the method may include skipping, using the at least one processor, an input procedure of a telephone number at the time of new registration in the service when the invitation message is transmitted using a communication protocol capable of using a telephone number as an address.

According to still another aspect of the inventive concepts, there is provided a non-transitory computer-readable medium having embodied thereon computer readable instructions for controlling at least one processor to, when executed, that may cause the at least one processor to provide a service to an unregistered user who is not registered in the service when the unregistered user accesses the service, store a service history provided to the unregistered user, and allow, once registered, the unregistered user to use the service while taking over a service history from when the unregistered user was not registered According to still another aspect of the inventive concepts, there is provided a system that may include at least one server, the at least one server including a memory having computer readable instructions stored thereon, and at least one processor configured to execute the computer readable instructions to, receive a service registration request from a terminal device, determine whether the received service registration request includes information indicating a limited service user, receive a unique identifier from the terminal device, register a user for the service based on the results of the determination and the received unique identifier, and transmit service registration information to the terminal.

According to at least one example embodiment, an unregistered user can be made to experience a service requiring registration, and after the unregistered user is registered in the service, the unregistered user can continue to use a history (service content) of the service at the time of unregistration, and high convenience for the user is provided.

BRIEF DESCRIPTION OF THE DRAWINGS

The foregoing and other features of inventive concepts will be apparent from the more particular description of non-limiting example embodiments of inventive concepts, as illustrated in the accompanying drawings in which like reference characters refer to like parts throughout the different views. The drawings are not necessarily to scale, emphasis instead being placed upon illustrating principles of inventive concepts. In the drawings:

FIGS. 4A to 4D illustrate an example of screens which are displayed on display devices of a terminal device of a registered user and a terminal device of an unregistered user according to at least one example embodiment.

FIG. 5 illustrates of a service history table of an unregistered user according to at least one example embodiment.

DETAILED DESCRIPTION

Figure 1:
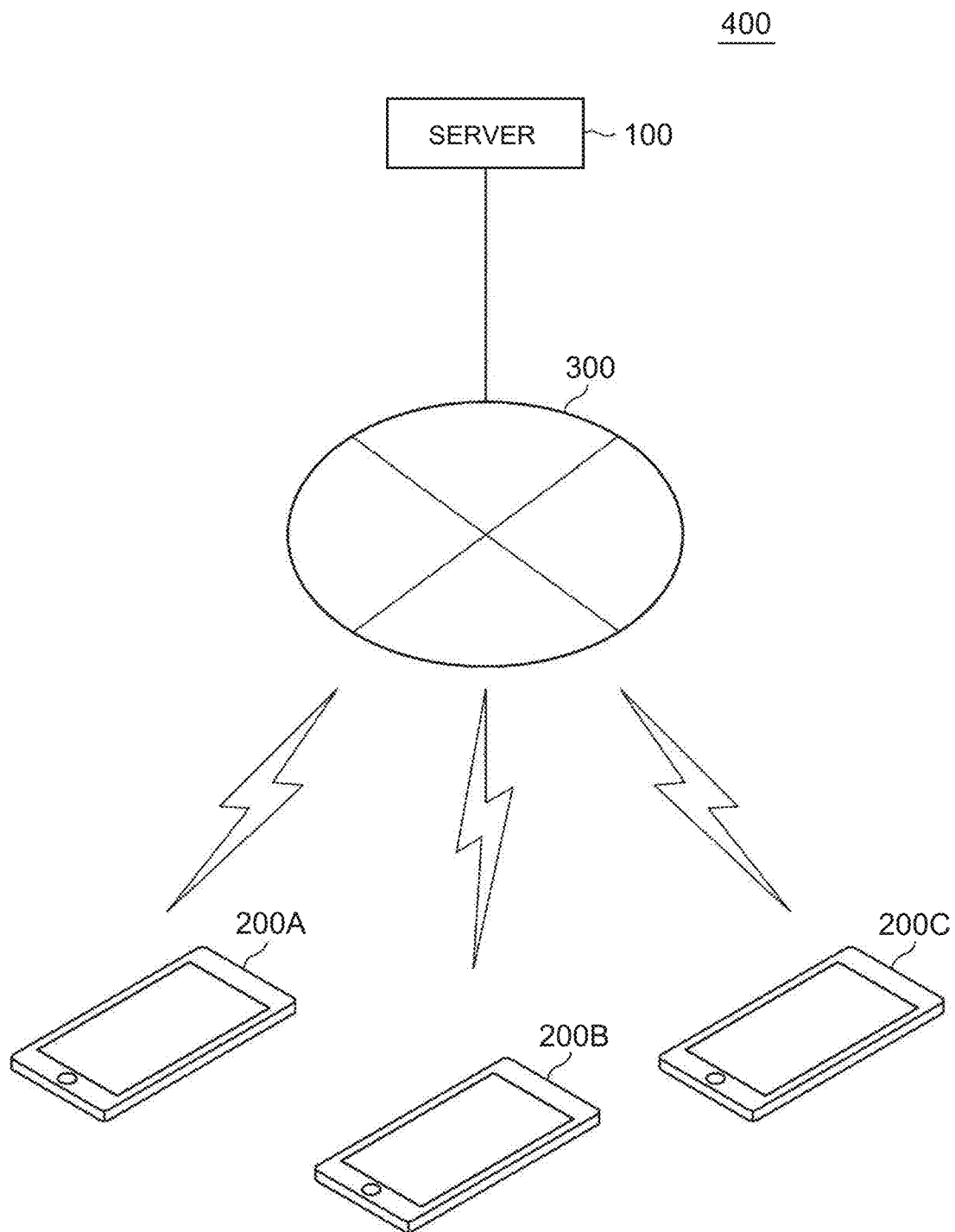
FIG. 1 is a schematic view of the configuration of a service system according to at least one example embodiment.

Various example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments of inventive concepts to those of ordinary skill in the art. In the drawings, the thicknesses of layers and regions are exaggerated for clarity. Like reference characters and/or numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein the term "and/or" includes any and all combinations of one or more of the associated listed items.

It will be understood that, although the terms "first", "second", etc. may be used herein to describe various elements, components, regions, layers and/or sections. These elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof. Expressions such as "at least one of," when preceding a list of elements, modify the entire list of elements and do not modify the individual elements of the list.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, some example embodiments of the inventive concepts will be described in detail in reference to the drawings. FIG. 1 is a schematic view of the configuration of a service system according to at least one example embodiment. As illustrated in FIG. 1, a service system 400 includes, for example, a server 100, terminal devices 200A to 200C, and a network 300. The server (computer) 100 is connected to the terminal devices 200A to 200C through the network 300. In FIG. 1, for simplification of description, although only three terminal devices and one server is illustrated, it is needless to say that any number of terminal devices and/or servers may be provided.

The terminal devices 200A to 200C are communication terminals which may be represented by computing devices such as computers, laptops, smartphones, tablets, PDAs, smart televisions, a gaming device, or the like. Hereinafter, description will be provided assuming that a user (user A) of the terminal device 200A and a user (user B) of the terminal device 200B are registered in a service according to some example embodiments, and a user (user C) of the terminal device 200C is not registered in the service. The terminal device 200A and the terminal device 200B perform, for example, a chat as a part of the service according to some example embodiments that use a messaging application (hereinafter, abbreviated as a "message application") provided by the service side (e.g., an application provided by the service provider), and the server 100 receives a message transmitted from the terminal device 200A through the network 300 and transmits the message to the terminal device 200B, or receives a message transmitted from the terminal device 200B through the network 300 and transmits the message to the terminal device 200A. In addition, the server 100 receives information relating to the operation instruction content input from the users with input reception devices of the terminal devices 200A to 200C, and performs processing according to the instruction content.

Figure 2:
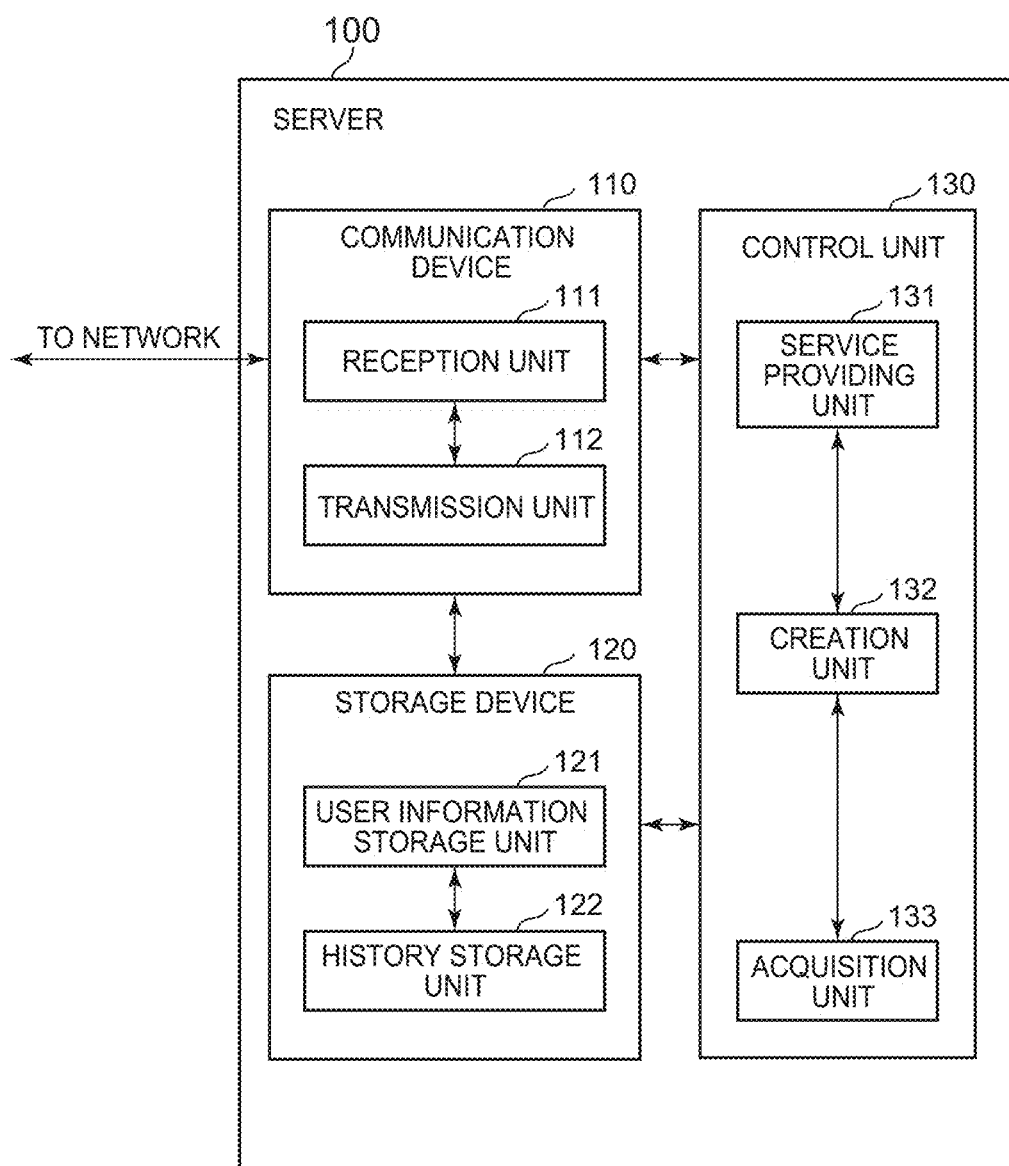
FIG. 2 is a block diagram of a server according to at least one example embodiment.

FIG. 2 is a block diagram of the server 100 according to at least one example embodiment. As illustrated in FIG. 2, the server 100 includes a communication device 110, a storage device 120, and a processor 130.

The communication device 110 has a function of executing communication with the terminal devices 200A to 200C through the network 300 according to an instruction from the processor 130. The communication may be executed in a wired or wireless manner, and any communication protocol may be used as long as communication can be executed.

The communication device 110 includes a reception unit 111 and a transmission unit 112. Although details will be described below, the reception unit 111 receives an invitation request for inviting an unregistered user to the service from a registered user who is registered in the service. The transmission unit 112 transmits an invitation message to the service to an unregistered user according to the invitation request. When a messaging service is a service for exchanging messages between registered users set as friends, and when an unregistered user is registered in the service, the transmission unit 112 transmits information for displaying a registered user included in information of the invitation message on a display device 250C of the unregistered user as a candidate for friends of the unregistered user. Hereinafter, although an aspect in which the terminal device 200A transmits an invitation request will be described, the same applies to a case where the terminal device 200B transmits an invitation request.

The storage device 120 has a function of storing various programs and data desired, useful for, and/or necessary for the operation of the server 100. The storage device 120 includes a user information storage unit 121 and a history storage unit 122. The user information storage unit 121 stores information (various kinds of information desired, useful for, and/or necessary for service registration, such as a user ID (identifier) and a telephone number) of a user registered in the service. The history storage unit 122 stores a service history of an unregistered user by a service providing unit 131 described below. The history storage unit 122 stores an invitation message and user identification information (details will be described) in association with each other. Typically, the storage device 120 is realized by various storage mediums, such as a hard disc drive (HDD), a solid state drive (SSD), and a flash memory, etc.

The processor 130 is one or more processors (and/or processor cores, distributed processors, networked processors, etc.) which has a function of controlling the respective device and/or units of the server 100. The processor 130 is configured to execute processes by retrieving programs (e.g., computer readable instructions) and data from memory (not shown) or the storage device 120 to process them, thereby achieving control and functions of the devices and/or units of the entire server 100. Once the program instructions are loaded into the processor 130, the processor 130 executes the program instructions, thereby transforming the processor 130 into a special purpose processor. The processor 130 includes a service providing unit 131, a creation unit 132, and an acquisition unit 133. Although details will be described below, the service providing unit 131 provides the service to an unregistered user who is not registered in the service when the unregistered user accesses the service. When the unregistered user is registered in the service, the service providing unit 131 allows the unregistered user to use the service while taking over a service history used when the unregistered user is not registered in the service. The service providing unit 131 provides the service to an unregistered user who accesses the service according to the invitation message transmitted from the transmission unit 112. The service providing unit 131 provides the service to a user having user identification information associated with the invitation message among users who access the service according to the invitation message.

The service providing unit 131 limits the content of the service to be provided to the unregistered user compared to the content of the service to be provided to the registered user. When a service includes a messaging service for exchanging messages between registered users, the service providing unit 131 may or may not prohibit the unregistered user from using selected service content, functionality, applications, etc. usable by the registered user, for example service content other than a text messaging service. For example, the content may include transmitting an image, audio data, video, a moving image (e.g., animation, animated GIFs, etc.), a stamp (digital sticker), text, and the like. As another example, the service providing unit 131 may or may not prohibit the unregistered user from exchanging a message with the registered user not included in information relating to one or more registered users included in the invitation message who can exchange messages with the unregistered user according to some example embodiments.

When a service includes a call service for allowing a voice call using a communication line between registered users, the service providing unit 131 may or may not prohibit the unregistered user from using the call service.

When the invitation message is transmitted using a communication protocol capable of using a telephone number as an address, the service providing unit 131 provides the service after skipping an input procedure of a telephone number desired, useful for, and/or necessary at the time of new registration in the service.

The creation unit 132 creates the invitation message to be transmitted to the unregistered user according to the invitation request from the registered user. The acquisition unit 133 acquires user identification information of the unregistered user who accesses the service according to the invitation message.

Figure 3:
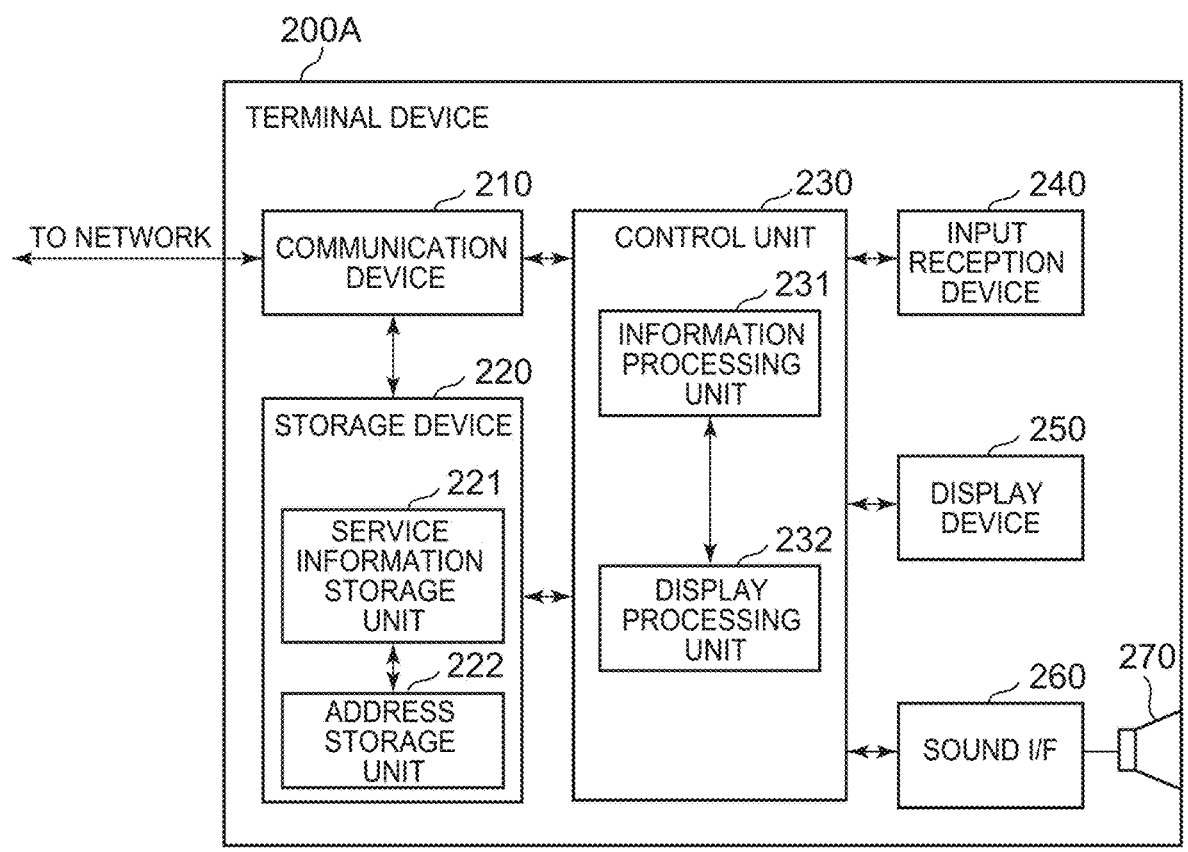
FIG. 3 is a block diagram of a terminal device according to at least one example embodiment.

Next, the terminal device will be described. FIG. 3 is a block diagram of the terminal device 200A according to at least one example embodiment. Here, although the terminal device 200A will be described, the same applies to the terminal devices 200B and 200C.

As illustrated in FIG. 3, the terminal device 200A includes a communication device 210, a storage device 220, a processor 230, an input reception device 240, a display device 250, a sound interface (I/F) 260, and a speaker 270. In addition, the processor 230 includes an information processing unit 231 and a display processing unit 232. The communication device 210 has a function of executing communication with the server 100 through the network 300. The communication may be executed in a wired or wireless manner (e.g., using the Internet, an intranet, a WAN, a LAN, a PAN, a radio data network, a wireless network, a wireless phone network, etc.), and any communication protocol may be used as long as communication and/or data transmission can be executed.

The storage device 220 includes a service information storage unit 221 and an address storage unit 222, and has a function of storing various programs, computer readable program instructions, or various kinds of data desired, useful for, and/or necessary for the operation of the terminal device 200A. For example, the service information storage unit 221 stores information of a message application which is downloaded from an application server and installed on the terminal device 200A. The address storage unit 222 includes information, such as telephone numbers of acquaintances of the user A, stores, and the like or various Email addresses registered by the user A of the terminal device 200A, etc. Typically, the storage device 220 is realized by various recording mediums, such as an HDD, an SSD, and a flash memory, CD-ROMs, DVDs, Blu-ray discs, etc.

The input reception device 240 receives an input from the user and transfers information for the input to the processor 230. The input reception device 240 is realized by a touch-sensitive panel or the like, which detects touch and the touch position with an indicator, such as the finger of the user or a stylus, and transfers the coordinates of the touch position to the information processing unit 231. Additionally, the input reception device 240 may interface with other input devices, such as a mouse, a keyboard, a game controller, a camera, a microphone, etc. According to at least one example embodiment, the input reception device 240 receives an input from the user, such as a chat message from the user, various icons or menu buttons displayed on the display device 250, a tap operation to a URL, and the like.

The processor 230 is one or more processors (and/or processor cores, distributed processors, networked processors, etc.) which has a function of controlling the respective devices and/or units of the terminal device 200A. The processor 230 is configured to execute processes by retrieving programs (e.g., computer readable instructions) and data from memory (not shown) or the storage device 220 to process them, thereby achieving control and functions of the devices and/or units of the entire terminal device 200A. Once the program instructions are loaded into the processor 230, the processor 230 executes the program instructions, thereby transforming the processor 230 into a special purpose processor.

The processor 230 includes an information processing unit 231 and a display processing unit 232. The information processing unit 231 has a function of performing control for data transmission from the communication device 210 to the server 100 according to information input from the input reception device 240. The information processing unit 231 has a function of transferring information received from the server 100 with the communication device 210 to the display processing unit 232. The information processing unit 231 has a function of starting the message application according to the input of the user to the input reception device 240 and instructing the communication device 210 to transmit, to the server 100, information relating to the invitation request for transmitting the invitation message to the terminal device 200C. When the user selects a URL displayed on the display device 250 with a tap operation or the like, the information processing unit 231 executes processing for receiving information for displaying a corresponding Web page on the display device 250 through the network 300.

The display processing unit 232 has a function of converting data for display transferred from the information processing unit 231 to pixel information and writing the pixel information to a frame buffer of the display device 250. The display device 250 may be a monitor, display panel, television, image projector, etc., which has a function of displaying an image according to display data written to the frame buffer by the display processing unit 232 of the processor 230. The display processing unit 232 has a function of instructing the display device 250 to display messages to be displayed in the message application or to display a Web page based on information received through the network 300.

The sound I/F 260 is an interface of the speaker 270 or headphones, etc. (not shown). The processor 230 outputs sound from the speaker 270 or the headphones through the sound I/F 260 when the call service included in the service according to at least one example embodiment.

Next, an aspect in which a user not registered in a service is invited by a user registered in the service and uses the service will be described referring to the drawings. FIGS. 4A to 4D illustrate an example of screens which are displayed on the display devices of the terminal device 200A of the registered user and the terminal device 200C of the unregistered user. Hereinafter, although the components of the terminal device 200C are attached with "C" after reference numerals, the functions of the components in the terminal device 200C are the same as those described in the terminal device 200A.

FIG. 4A illustrates an example of a message application screen which is displayed on the display device 250 of the terminal device 200A according to at least one example embodiment. The user A of the terminal device 200A is registered in the service and uses the message application provided by the service. FIG. 4A illustrates an example of a screen when the user A invites another user to a "chat room" where a chat is performed among a plurality of members through a network. As illustrated in the drawing, a friends list 510 registered in the service and a users list 520 stored in the address storage unit 222 of the user A but not registered in the service are displayed on the display device 250 according to at least one example embodiment, but the example embodiments are not limited thereto. The user A can select users desired to invite to the service (desired to chat) among the unregistered users displayed in the users list 520 as well as the friends registered in the service and can transmit an invitation request to the server 100. In the example of the drawing, as the members of the chat room, a "user B" and a "user D" as a registered user and a "user C" as an unregistered user are selected.

FIG. 4B illustrates a screen example of the display device 250C of the terminal device 200C of the user C as an unregistered user who receives the invitation message transmitted from the server 100 according to the invitation request of the user A according to at least one example embodiment. According to this example embodiment, the invitation message is transmitted using a communication protocol capable of using a telephone number as an address, for example, a short message service (SMS), a multimedia messaging service (MMS), or the like, but is not limited thereto. For example, the invitation message may use other types of identifiers as the address for the unregistered user, such as IP address, email address, mailing address, and/or a PIN, unique identification number, screen name, user name according to a separate online service, etc. As illustrated in the drawing, a URL of a chat room where an unregistered user can perform a chat is displayed on the display device 250C of the user C along with a message 530 delivered from the user A using the SMS, for example, a message "YOU ARE INVITED TO CHAT ROOM BY USER A. PLEASE ACCESS FOLLOWING URL AND INPUT PASSCODE QW1U88 TO PARTICIPATE IN CHAT ROOM."

If the user C taps and selects the URL of the chat room described in the message 530, as in FIG. 4C, an input message 540 of a passcode is displayed on the display device 250C of the user C according to at least one example embodiment. When desiring to experience the service, the user C inputs a passcode described in the message 530 through the input reception device 240C and taps a "PARTICIPATE IN ROOM" button. In the example of FIGS. 4A to 4D, "QW1U88" is input. Then, the display device 250C transitions to a chat screen (chat room) illustrated in FIG. 4D. The chat room illustrated in FIG. 4D is displayed using a Web browser for an unregistered user, but is not limited thereto and may be other software capable of displaying a graphical user interface, such as a smart device application, a computer program, etc. As illustrated in the drawing, an unregistered user can view a chat with a registered user, and can input a message 550 through the input reception device 240C. Here, as a display name of the user C as an unregistered user in the chat room, a telephone number or an address used for the invitation is used. Additionally, the user C may register his/her display name and may display the display name in the chat room. In the case of a registered user, a display name is different among users who are the members of the chat room. That is, a display name is different according to the relationship between a user of a mobile terminal displaying the chat room and the members of the chat room. For example, when the user A and the user B have a friendship, and when the name of the user A is registered as "A" in an address storage unit 222B of a mobile terminal B of the user B, the user A is displayed as "A" in the chat room displayed in the mobile terminal B. When the user A and the user D have a friendship, and when the name of the user A is registered as "Mr. A" in an address storage unit 222D of a mobile terminal D of the user D, the user A is displayed as "Mr. A" in the chat room displayed in the mobile terminal D. When not registered, a display name set by the user A is displayed.

A history of a chat performed in the chat room illustrated in the drawing is stored in the history storage unit 122 of the server 100. The chat history includes information, such as the content (e.g., text, audio, video, URLs, animations, files, data, etc.) and the senders of messages, the sending date and time of the messages, and, though not illustrated in the drawing, stamps transmitted from a registered user (stamps will be described below). The storage of the chat history may be performed by saving the text log of the chat content, the hypertext markup language (HTML) of the chat room screen display, copies of the audio, video, files and/or data transmitted, or the like. In addition, the chat history may be saved in a data format dedicated to the message application. Then, when the user C is newly registered in the service, a chat history stored in the history storage unit 122 and performed when the user C is not registered in the service is taken over. That is, the user C can continue to view the chat history performed at the time of unregistration in the service, or can continue a chat with the chat room members. A registered user may store a chat history in the storage device of his/her terminal device.

In this way, according to some example embodiments, it is possible to allow a user to experience the content of the service even if the user is not registered in the service and to prompt the unregistered user to register in the service. In addition, since the content of the service used at the time of unregistration can be used continuously after registration, high convenience for the user is provided.

When an unregistered user selects a URL described in the invitation message and accesses a chat room as a Web site, a cookie, or other software, may be assigned to the terminal device 200C of the unregistered user as user identification information. Additionally, the user identification information may be tracked on the server by other means, such as tracking the unregistered user's IP address, MAC address, phone number, etc. At this time, the invitation message (e.g., URL) transmitted to the unregistered user and the assigned user identification information (e.g., cookie) are stored in the history storage unit 122 of the server 100 in association with each other. When the unregistered user accesses the chat room after the first access, the acquisition unit 133 of the server 100 acquires the cookie assigned to the terminal device 200C, and the service providing unit 131 displays the chat room only for a user associated with the cookie stored in the history storage unit 122 among users who access the URL.

In this way, the user identification information and the URL of the chat room are stored in association with each other, and the chat room is displayed only for a user having the user identification information associated with the URL; therefore, for example, even if the URL is leaked to a user who does not receive the invitation message, it is possible to prevent unauthorized access of a user who is not invited.

The content of the service that an unregistered user can enjoy in the chat room may be limited compared to a registered user. For example, a registered user can use stamps (e.g., digital stickers, emojis, digital images, photos, etc.) set in advance in messages transmitted during a chat, in addition to text messages. The stamps are of various types (illustration, animation) capable of representing user's feelings, and the registered user may transmit only stamps without using text. However, the service providing unit 131 may allow an unregistered user to view stamps transmitted from a registered user in the chat room where the unregistered user performs a chat but may prohibit the unregistered user to use the stamps. In addition to the stamps, sound data, moving images, images, and the like may be used only by a registered user.

In this way, according to at least one example embodiment, since an unregistered user is prohibited to use part of content usable only by a registered user, it is possible to prompt an unregistered user to register in the service.

The invitation message includes information for one or more registered users who can exchange messages with an unregistered user, and the service providing unit 131 may prohibit an unregistered user from exchanging messages with registered users not included in this information (that is, not included in a group member of a chat in the chat room described in the URL). As described above, an unregistered user can perform a chat only by receiving an invitation message from a registered user and accessing a URL described in the invitation message. Here, the invited members of the chat room are determined by the registered user. Therefore, the unregistered user cannot start and perform a chat with a registered user who is not the invited member of the chat room.

In this way, according to at least one example embodiment, since an unregistered user does not start a new chat with a registered user, it is possible to prompt an unregistered user to register for the service.

A chat will be performed between registered users set as friends in advance, and when an unregistered user is registered in the service, registered users who are estimated as candidates of the friends of the unregistered user may be displayed on the display device 250C of the unregistered user C. Here, the members of the chat room to which the unregistered user C is invited can be the friends of the unregistered user C. Therefore, when the unregistered user C is registered in the service, information for displaying the members of the chat room on the display device 250C as the candidates of the friends may be transmitted from the transmission unit 112 of the server 100 to the terminal device 200C.

With this configuration, it is possible to eliminate the time when an unregistered user searches for friends after service registration, and to provide a service with high convenience.

In the above description, although the messaging service (chat) has been described as an example of a service, the example embodiments are not limited thereto, and a call service for allowing a voice call between registered users using a communication line is included as a service. However, the service providing unit 131 may prohibit an unregistered user to use a call service. The content of the service including the call service can be known by displaying a message to prompt the unregistered user to register in the service, "REGISTRATION IS REQUIRED FOR USE OF STAMP AND NO-CHARGE CALL. CONVERSATION IS CONTINUED.", in the chat room displayed using the Web browser, for example, as illustrated in FIG. 4D.

In this way, according to at least one example embodiment, since the call service is used only by a registered user, it is possible to prompt an unregistered user to register in the service.

In the above description, although an aspect in which a communication protocol, such as the SMS, with a telephone number as an address is used to transmit the invitation message has been described, the example embodiments are not limited thereto, and the invitation message may be transmitted to an Email address stored in an address storage unit 222 of a registered user, through a messaging application, an online game, a social media service, a website, etc. When a communication protocol with a telephone number as an address is used to transmit the invitation message, an input procedure of a telephone number desired, useful for, and/or necessary when an unregistered user newly registers himself or herself in the service may be skipped.

In this way, according to at least one example embodiment, since the input procedure desired, useful for, and/or necessary when an unregistered user newly registers himself or herself in the service is skipped, it is possible to enhance convenience for the user.

A service history of an unregistered user which is stored in the history storage unit 122 of the server 100 according to at least one example embodiment will be described. FIG. 5 illustrates an example of a service history table of an unregistered user which is stored in the history storage unit 122. The history storage unit 122 may be implemented as a database, or the like. As illustrated in the drawing, a service history table 122TBL includes "USER ID", "TERMINAL IDENTIFICATION INFORMATION", "CHAT ROOM URL", "INVITATION MESSAGE", "PASSCODE", "USER IDENTIFICATION INFORMATION", "MEMBER", and the like. In regard to a registered user, "USER ID" is one of the user accounts set by a service management side. Accordingly, in regard to an unregistered user, "USER ID" may be set by the service management side separately from a registered user. "TERMINAL IDENTIFICATION INFORMATION" indicates information, such as a device key which is an individual identification number of a mobile phone terminal or a security identifier (SID), for identifying an individual terminal. In the example embodiment depicted in the drawing, when the user ID of an unregistered user is "User C", a chat room specified with "https://guest.line.me/134343411" is associated, and the access code of the chat room is "QWU1U88". A cookie "jLB**31" is assigned as user identification information. An invitation message is transmitted with the SMS, and a telephone number "090-xxΔ☐" is stored. In addition, it is understood that the invited members of the chat room are "User_A, User_B, User_D". It is to be noted that the user ID and the like illustrated in the drawing are examples, and the example embodiments are not limited thereto. For example, the user ID may be a number, username, email address, and/or other unique identifier.

Figure 6:
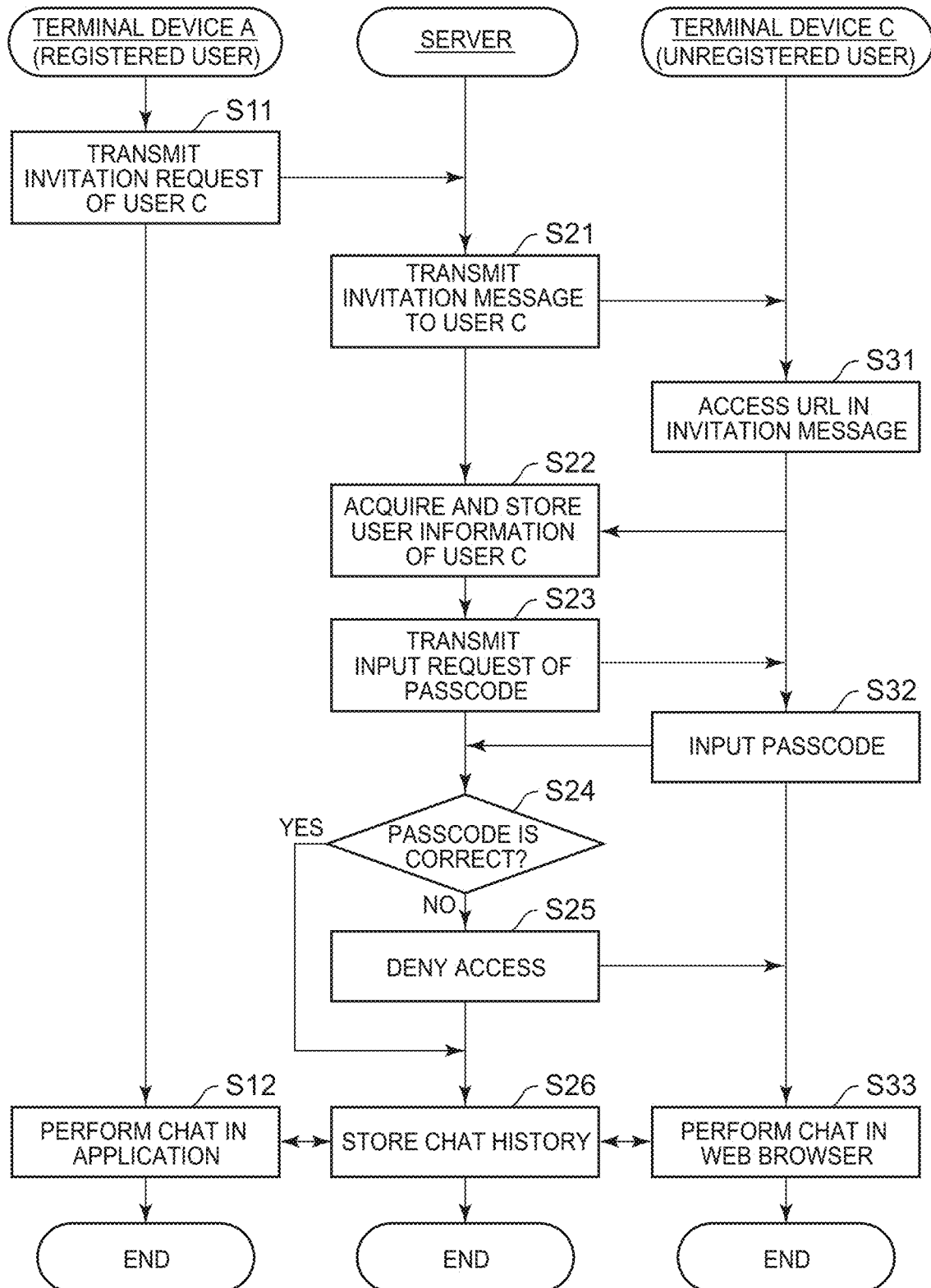
FIG. 6 is a flowchart illustrating processing of a terminal device and a server when a terminal device 200A (registered user) invites a terminal device 200C (unregistered user) to a chat room according to at least one example embodiment.

Next, the operation of the service system according to at least one example embodiment will be described referring to a flowchart. FIG. 6 is a flowchart illustrating processing of the terminal devices 200A and 200C and the server 100 when the user A (registered user) of the terminal device 200A invites the user C (unregistered user) of the terminal device 200C to the chat room. In the drawing, for simplification, the terminal devices 200A and 200C are described as a "terminal device A" and a "terminal device C".

First, an invitation request of the user C is transmitted from the communication device 210 of the terminal device 200A (Step S11). The reception unit 111 of the server 100 receives the invitation request, and the creation unit 132 creates an invitation message for the user C. Then, the invitation message is transmitted from the transmission unit 112 of the server 100 to the terminal device 200C (Step S21). The user C of the terminal device 200C accesses a URL described in the invitation message displayed on the display device 250C through the input reception device 240C (Step S31). The acquisition unit 133 of the server 100 assigns user identification information (cookie) of the terminal device 200C and stores the user identification information in the history storage unit 122 (Step S22). Next, the server 100 transmits an input request for a passcode from the transmission unit 112 to the terminal device 200C (Step S23). At this time, the input message 530 of the passcode illustrated in FIG. 4C is displayed on the display device 250C of the terminal device 200C. The user C of the terminal device 200C inputs the passcode described in the invitation message through the input reception device 240C and transmits the passcode to the server 100 (Step S32).

The service providing unit 131 of the server 100 determines whether or not the passcode is correct based on the service history table 122TBL stored in the history storage unit 122 (Step S24). When it is determined that the passcode is not correct, the server 100 denies access to the terminal device 200C (Step S25). At this time, for example, display information for displaying a message "PASSCODE IS WRONG" on the display device 250C of the terminal device 200C may be transmitted to the terminal device 200C.

When it is determined in Step S24 that the passcode is correct, the server 100 transmits display information for displaying a chat room with the Web browser to the terminal device 200C of the user C as an unregistered user, and the user C of the terminal device 200C performs a chat in the chat room with the Web browser (Step S33). The server 100 transmits display information for displaying the content (message) of the chat to the terminal device 200A of the user A as a registered user, and the user of the terminal device 200A performs a chat in the application (Step S12). A chat history among members including the user A and the user C is stored in the storage device 120 of the server 100 (Step S26).

Figure 7:
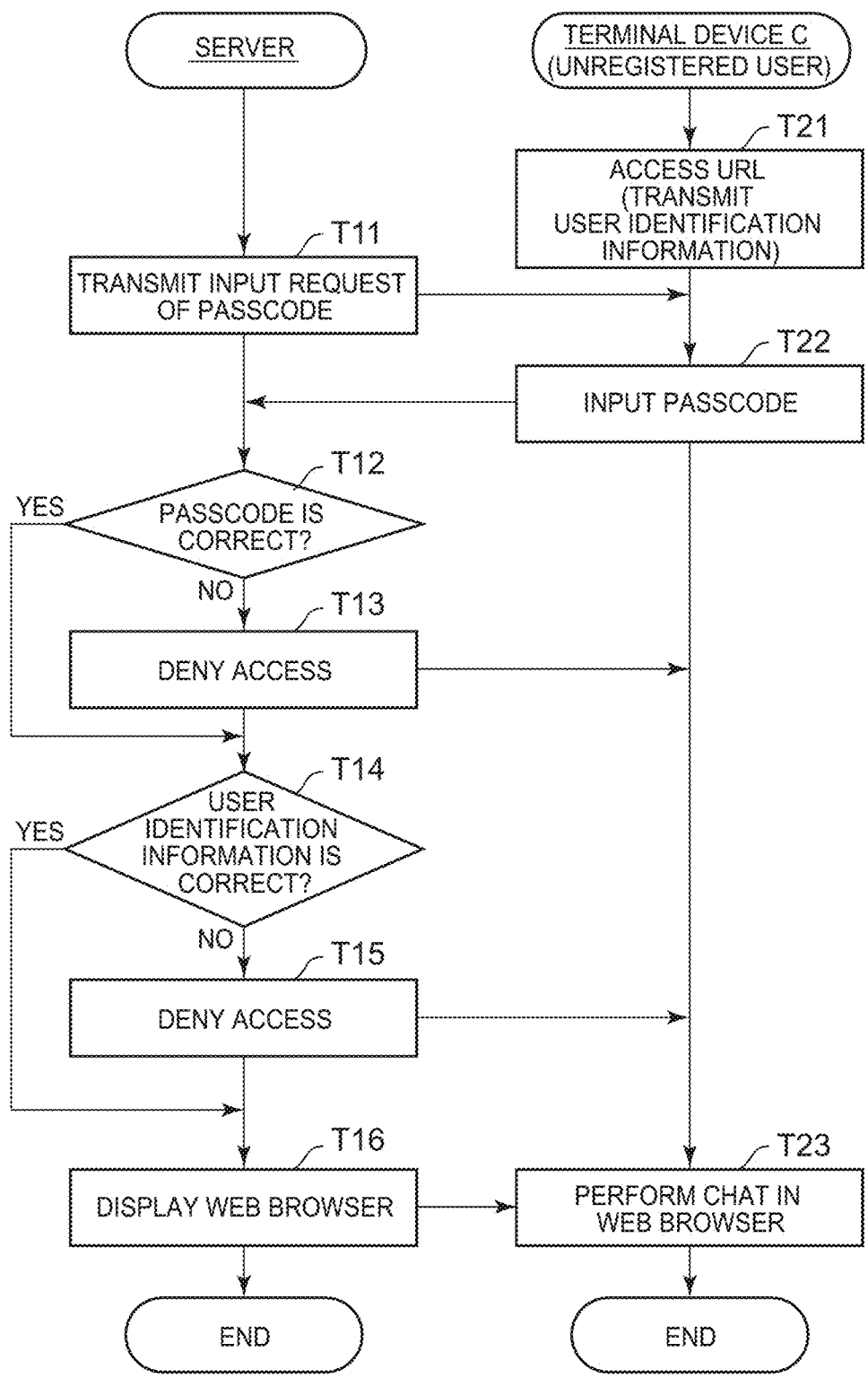
FIG. 7 is a flowchart illustrating an example of processing of a server when an unregistered user accesses a URL of a chat room according to at least one example embodiment.

Next, processing when the user C as an unregistered user accesses the chat room after the first access will be described referring to a flowchart. FIG. 7 is a flowchart illustrating processing of the server when the user C accesses the URL of the chat room according to at least one example embodiment. As illustrated in the drawing, first, the user C accesses the URL of the chat room described in the invitation message (Step T21). At this time, the user identification information (cookie) assigned from the server 100 is transmitted. If access to the URL is received, the server 100 transmits an input request for a passcode to the terminal device 200C. The user C of the terminal device 200C inputs the passcode through the input reception device 240C, and the input passcode is transmitted from the communication device 210 to the server 100 (Step T22). The service providing unit 131 of the server 100 determines whether or not the passcode is correct (Step T12). When it is determined that the passcode is not correct, the server 100 denies access of the user C to the chat room, and does not transmit the display information of the chat room to the terminal device 200C (Step T13). At this time, for example, display information for displaying a message "PASSCODE IS WRONG" on the display device 250C of the terminal device 200C may be transmitted to the terminal device 200C.

When it is determined in Step T12 that the passcode is correct, the service providing unit 131 determines whether or not the user identification information is correct with reference to the service history table 122TBL stored in the history storage unit 122 (Step T14). When it is determined that the user identification information is not correct, the server 100 denies access of the user C to the chat room, and does not transmit the display information of the chat room to the terminal device 200C (Step T15). When it is determined in Step T14 that the user identification information is correct, the service providing unit 131 of the server 100 transmits the display information for displaying the chat room with the Web browser from the transmission unit 112 to the terminal device 200C (Step T16). The chat room is displayed in the Web browser on the display device 250C of the terminal device 200C, and the user C as an unregistered user can perform a chat (Step T23).

Figure 8:
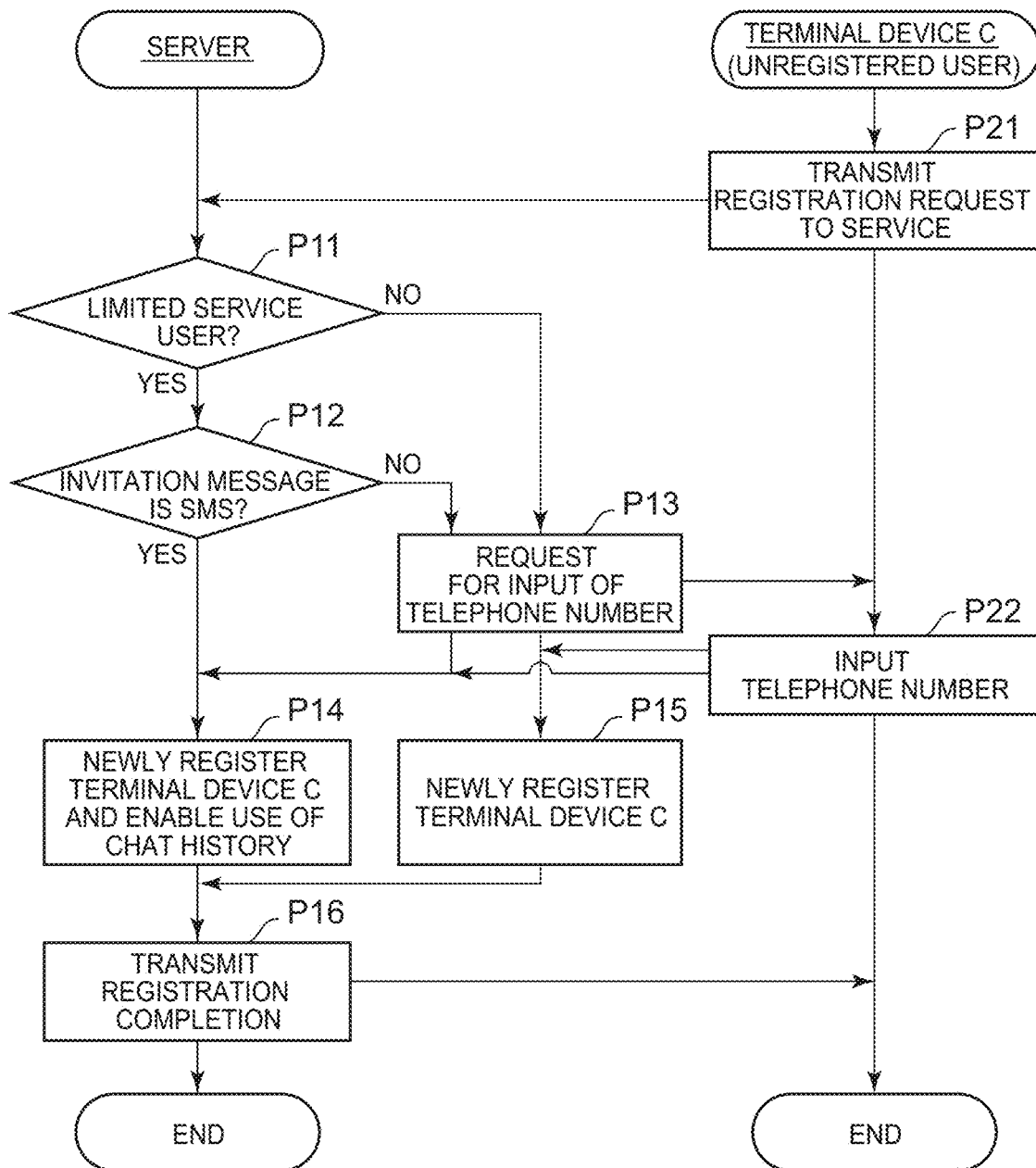
FIG. 8 is a flowchart illustrating an example of processing of a server when a user C registers himself or herself in a service according to at least one example embodiment.

Next, processing when the user C as an unregistered user registers himself or herself in the service will be described. FIG. 8 is a flowchart illustrating an example of processing of the server when the user C registers himself or herself in the service according to at least one example embodiment. First, a registration request to the service is transmitted from the terminal device 200C (Step P21). The registration request is performed, for example, by installing an application for enjoying the service in the terminal device 200C and registering user information. If the registration request is received, the server 100 determines whether or not the user C of the terminal device 200C is a limited service user, that is, whether or not the user C is invited and uses the service as an unregistered user (Step P11). This is determined, for example, using a telephone number, email address, unique user identifier, or the like stored in the history storage unit 122. However, information which is used to determine whether or not a user is invited and uses the service as an unregistered user may be any one of an Email address, user identification information, etc., and terminal identification information stored in history storage unit 122, or a combination thereof.

When it is determined in Step P11 that the user C is a limited service user, the service providing unit 131 determines whether or not the invitation message for the user C is transmitted with the SMS (Step P12). When it is determined in Step P11 that the user C of the terminal device 200C is not a limited service user and when it is determined in Step P12 that the invitation message for the user C is not transmitted with the SMS, an input request for a telephone number desired, useful for, and/or necessary at the time of registration is transmitted to the terminal device 200C (Step P13). The user C of the terminal device 200C receives the input request for the telephone number, inputs the telephone number, and transmits the telephone number to the server 100 (Step P22).

When the user C of the terminal device 200C is a limited service user, in Step P14, the user C is registered in the service by the server 100 and can use the service while taking over the history of using the service as an unregistered user. When the user C of the terminal device 200C is not a limited service user, in Step P15, the user C is registered in the service by the server 100. Thereafter, the server 100 transmits the gist of registration completion to the terminal device 200C (Step P16).

The effects of the example embodiments will be described again. According to the example embodiments, it is possible to allow an unregistered user to experience the content of the service even if the unregistered user is not registered in the service, and to prompt the unregistered user to register in the service. In addition, since the content of the service used at the time of unregistration can be continuously used, high convenience for the user is provided. The user identification information and the URL of the chat room are stored in association with each other, and the chat room is displayed only for a user having the user identification information associated with the URL; therefore, for example, even if the URL is leaked to a user who does not receive the invitation message, it is possible to prevent an unauthorized access of a user who is not invited.

According to some example embodiments of the inventive concepts, an unregistered user is prohibited to use part of the service usable only by a registered user. An unregistered user cannot start a new chat with a registered user. In addition, a call service is applied only for a registered user. With these, it is possible to prompt an unregistered user to register in the service.

According to some example embodiments of the inventive concepts, when the invitation message for an unregistered user is transmitted using a communication protocol with a telephone number as an address, the input procedure desired, useful for, and/or necessary when an unregistered user newly registers himself or herself in the service is skipped; therefore, it is possible to enhance convenience for the user.

Although some example embodiments of the inventive concepts has been described, it is needless to say that the example embodiments are not limited thereto. For example, in the above description, although an aspect in which the cookie is used as user identification information has been described, identification information of a user terminal based on a communication protocol (for example, wireless access protocol (WAP)) for communication or terminal identification information may be used as user identification information.

A period during which an unregistered user can view a chat room may be limited. For example, a chat in a chat room may be performed within two weeks from the issuance of an invitation message. With this configuration, it is possible to attract an unregistered user's attention to the registration request to the service. When an unregistered user is registered in the service afterwards, the content of a chat performed by another member in a period during which an unregistered user cannot view the chat room may be viewed or not by the unregistered user according to settings by a sender of the invitation request, or may be viewed by the unregistered user without settings.

In the example embodiments described above, an aspect in which the members of the chat room who perform a chat are assembled (invited) by a registered user has been described. However, the members of the chat room may be the members of a group set in advance among registered users. In addition, the chat room may include a plurality of unregistered users. In this case, although the URL of the chat room is the same for each unregistered user, a combination of an access code and user identification information is different for each unregistered user, whereby it is possible to prevent unauthorized access of a user other than the invited users to the chat room.

The chat room used by an unregistered user may not be displayed with the Web browser after the unregistered user is registered in the service. For example, when the unregistered user clicks the URL of the chat room described in the invitation message after registration, there may be no transition to the Web browser, and the message application may start and display the chat room.

The members of the chat room need not be a plurality of people, and a registered user who transmits an invitation request and an unregistered user may perform a chat one-to-one. In this case, when the unregistered user is registered in the service, the registered user who transmits the invitation request may be automatically registered as the friend of the unregistered user.

In the above description, an aspect in which a user who is invited to the chat room is an unregistered user has been described. However, when a chat is performed among registered users (having a friendship) set as friends, if users registered in the service have no friendship, the users may not be selected as the other party of a talk on the message application. For example, in FIG. 4A, while a user J described in an address book of the user A is registered in the service (uses the message application), since the user J has no friendship with the user A, as illustrated in the drawing, the user J is not described in the friends list 510. According to at least one example embodiment, the user A can perform an invitation request for the user J having such a relationship. That is, a user who is invited to the chat room may be a registered user. Since the user J is registered in the service, the user A does not need to perform a chat in the chat room on the Web browser, a message to prompt the user A to add the user J as a friend is displayed, and if the user A registers the user J as a friend, a chat can be performed on the message application. In this case, the user J is specified from a telephone number, an Email address, or the like used when the user J is registered in the service, and information relating to the user J can be displayed for the user A.

The terminal devices 200A to 200C are not limited to smartphones. A terminal device may be any information processing device as long as the information processing device can realize the functions described in the embodiment described above, and may be, for example, a mobile terminal, a mobile phone, a personal computer (PC), a tablet terminal, a gaming console, a smart television, a smart watch, any other smart device, a PDA, etc.

Each functional unit of the server 100 may be realized by a logic circuit (hardware) constituted of an integrated circuit (IC) chip or large scale integration (LSI), or a dedicated circuit, or may be realized by software using a central processing unit (CPU). In addition, each functional unit may be realized by one or a plurality of integrated circuits, or the functions of a plurality of functional units may be realized by a single integrated circuit. The LSI may be referred to as VLSI, super LSI, or ultra LSI depending on the degree of integration.

When the respective functional units of the server 100 are realized by software, the server 100 or each of the terminal devices 200A to 200C includes a CPU which executes commands of programs as software for realizing the respective functions, a read only memory (ROM) or a storage device (these are referred to as "recording mediums") in which the programs (e.g., computer readable instructions) and various kinds of data are recorded so as to be readable by a computer (or the CPU), a random access memory (RAM) which develops the programs, and the like. Then, the computer (or the CPU) reads the programs from the recording mediums and executes the programs, thereby transforming the computer (or the CPU) into a special purpose computer (or special purpose CPU). For the recording mediums, "non-transitory tangible mediums", such as a tape, a disc, a card, a semiconductor memory, and a programmable logic circuit, can be used. The programs may be supplied to the computer through an arbitrary transmission medium (a communication network, a broadcasting wave, or the like) capable of transmitting the programs.

The program described above can be implemented using, for example, a script language, such as ActionScript or JavaScript (Registered Trademark), an object-oriented programming language, such as Objective-C or Java (Registered Trademark), a markup language, such as HTML5, or the like.

The server, the method of controlling a server, and the program can be used as a server, a method of controlling a server, and a program for various service systems requiring registration.

The example embodiments as disclosed herein may comprise program code including program instructions, software components, software modules, data files, data structures, and/or the like that are implemented by one or more physical hardware devices. Examples of program code include both machine code produced by a compiler and higher level program code that is executed using an interpreter. The hardware devices may include one or more processors. The one or more processors are computer processing devices configured to carry out the program code by performing arithmetical, logical, and input/output operations. Once the program code is loaded into the one or more processors, the one or more processors may execute the program code, thereby transforming the one or more processors into special purpose processor(s).

Alternatively, or in addition to the processors discussed above, the hardware devices may include one or more Central Processing Units (CPUs), digital signal processors (DSPs), application-specific-integrated-circuits (ASICs), SoCs, field programmable gate arrays (FPGAs), or the like. In at least some cases, the one or more CPUs, SoCs, DSPs, ASICs and FPGAs, may generally be referred to as processing circuits and/or microprocessors.

The hardware devices may also include one or more storage devices. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store program code for one or more operating systems and/or the program code for implementing the example embodiments described herein. The program code may also be loaded from a separate computer readable storage medium into the one or more storage devices and/or the one or more processors using a drive mechanism. Such separate computer readable storage medium may include a USB flash drive, memory stick, Blu-ray/DVD/CD-ROM drive, memory card, and/or other like computer readable storage medium (not shown). The program code may be loaded into the one or more storage devices and/or the one or more processors from a remote data storage device via a network interface, rather than via a computer readable storage medium. Additionally, the program code may be loaded into the one or more storage devices and/or the one or more processors from a remote computing system that is configured to transfer and/or distribute the program code over a network. The remote computing system may transfer and/or distribute the program code via a wired interface, an air interface, and/or any other like tangible or intangible medium. The one or more processors, the one or more storage devices, and/or the program code may be specially designed and constructed for the purposes of the example embodiments, or they may be known devices that are altered and/or modified for the purposes of the example embodiments.

It will be apparent to those skilled in the art that various modifications and variations can be made to the example embodiments without departing from the spirit or scope of the inventive concepts described herein. Thus, it is intended that the example embodiments cover the modifications and variations of the example embodiments provided they come within the scope of the appended claims and their equivalents.

What is claimed is:

1. A display method performed by at least one processor of a terminal, the terminal configured to perform transmission of content to a first terminal on which a message application is installed and reception of content received from the first terminal, the method comprising:
receiving invitation information regarding the message application from the first terminal, the invitation information transmitted based on a phone number of the terminal;
receiving first content from the first terminal;
transmitting second content to the first terminal;
displaying the first content and the second content on a display device of the terminal using a different application than the message application;
installing the message application on the terminal based on input received from a user of the terminal input into the terminal, the input being based on the invitation information regarding the message application;
receiving third content from the first terminal, the third content being different than the first content; and
displaying the first content, the second content, and the third content on the display device using the message application.

2. The display method according to claim 1, further comprising:
storing the first content and the second content in a storage device.

3. The display method according to claim 1, further comprising:
transmitting, using the message application, fourth content to the first terminal, the fourth content being unable to be transmitted using the different application; and
displaying the fourth content on the display device using the message application.

4. The display method according to claim 3, wherein
the transmitting the fourth content further using the message application includes transmitting a stamp using the message application; and
the different application does not have a function of transmitting a stamp.

5. The display method according to claim 1, further comprising:
receiving the invitation information regarding the message application via SMS or MMS.

6. The display method according to claim 5, wherein
the receiving the invitation information regarding the message application is transmitted via the SMS or the MMS occurs based on input from a second user of the first terminal input into the message application of the first terminal.

7. The display method according to claim 1, wherein the displaying the first content, the second content, and the third content on the display device further includes:
displaying the first content, the second content, and the third content on the display device in chronological order.

8. The display method according to claim 1, wherein
the displaying the first content and the second content using the different application occurs before the installing the message application is performed.

9. The display method according to claim 1, further comprising:
displaying the first content and the second content on the display device using the different application based on input from the user of the terminal after the message application is installed.

10. The display method according to claim 1, wherein
the first content and the second content are a first message and a second message, respectively; and
the third content is a stamp.

11. The display method according to claim 1, wherein
the invitation information regarding the message application includes URL information.

12. The display method according to claim 1, wherein
the first content and the third content are transmitted by the first terminal to the terminal through a server; and
the second content is transmitted from the terminal to the first terminal through the server.

13. The display method according to claim 1, wherein
the different application is configured to transmit and receive content on a one-to-one basis; and
the message application is configured to transmit and receive content between at least the terminal, the first terminal, and a second terminal, the second terminal being different than the first terminal and the terminal.

14. The display method according to claim 1, wherein
the third content is transmitted by the first terminal to the terminal and a second terminal using the message application, the second terminal being different than the first terminal and the terminal.

15. The display method according to claim 14, wherein
the terminal, the first terminal, and the second terminal are included in members of a group associated with the message application.

16. The display method according to claim 1, wherein
the first content is transmitted by the first terminal based on input from a user of the first terminal input into the message application of the first terminal.

17. A non-transitory storage medium storing a program to be executed by at least one processor of a terminal, the program, when executed by the at least one processor, causes the at least one processor to:
receive invitation information from a first terminal regarding a message application installed on the first terminal, the invitation information transmitted based on a phone number of the terminal;
receive first content transmitted from the first terminal;
transmit second content to the first terminal;
display the first content and the second content on a display device of the terminal using a different application than the message application;
install the message application on the terminal based on input from a user of the terminal input into the terminal, the input being based on the invitation information regarding the message application;
receive third content from the first terminal, the third content being different than the first content; and
display the first content, the second content, and the third content, on the display device using the message application.

18. A terminal configured to perform transmission of content to a first terminal on which a message application is installed and reception of content transmitted from the first terminal, the terminal comprising:
a display device;
a memory having computer readable instructions stored thereon; and
at least one processor configured to execute the computer readable instructions to, receive invitation information from the first terminal regarding the message application installed on the first terminal, the invitation information transmitted based on a phone number of the terminal, receive first content transmitted from the first terminal, transmit second content to the first terminal, display the first content and the second content using a different application than the message application on the display device, install the message application on the terminal based on input from a user of the terminal input into the terminal, the input being based on the invitation information regarding the message application, receive third content from the first terminal, the third content being different than the first content, and display the first content, the second content, and the third content on the display device using the message application.

* * * * *